(12) United States Patent
de Castro

(10) Patent No.: US 10,399,317 B2
(45) Date of Patent: Sep. 3, 2019

(54) COMPOSITE IMAGE HEAT TRANSFER WITH SCANNABLE MARK

(71) Applicant: Avery Dennison Retail Information Solutions LLC, Mentor, OH (US)

(72) Inventor: Paulo J. de Castro, Sant Cugat Del Valles (ES)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 14/570,460

(22) Filed: Dec. 15, 2014

(65) Prior Publication Data

US 2015/0328871 A1 Nov. 19, 2015

Related U.S. Application Data

(60) Provisional application No. 62/000,167, filed on May 19, 2014.

(51) Int. Cl.
*G06K 19/06* (2006.01)
*B32B 37/00* (2006.01)
(Continued)

(52) U.S. Cl.
CPC ............ *B32B 37/025* (2013.01); *B32B 37/06* (2013.01); *B41M 3/12* (2013.01); *B41M 5/0256* (2013.01);
(Continued)

(58) Field of Classification Search
CPC ......... B44C 1/1712; B44C 1/16; B44C 1/162; B44C 1/165; B44C 1/17; C09J 7/35;
(Continued)

(56) References Cited

U.S. PATENT DOCUMENTS 4,610,904 A 9/1986 Mahn, Sr. et al.
5,364,688 A 11/1994 Mahn, Jr.
(Continued)

FOREIGN PATENT DOCUMENTS

CN 1741862 A 3/2006
EP 1264704 12/2002
(Continued)

OTHER PUBLICATIONS

International Search Report dated Feb. 16, 2015 for International Application No. PCT/US2014/070353 filed Dec. 15, 2014.
(Continued)

*Primary Examiner* — Thien M Le
*Assistant Examiner* — April A Taylor
(74) *Attorney, Agent, or Firm* — Avery Dennison Retail Information Services, LLC

(57) ABSTRACT

A composite image heat transfer is disclosed for use on specific merchandising articles, sports jerseys, or other apparel for a specific sport. A scannable mark would be embedded in a heat transfer positioned on a sports jersey, such as a jersey number or a club crest. The scannable mark would be scanned by a user to provide stats, personal information, or other information about the corresponding sports team/club and/or individual athlete. The user can also register the scannable mark and follow the sports team/club and/or athlete on social media. Thus, the composite image heat transfer with embedded scannable mark would link each jersey number with information related to the corresponding player/athlete, and each club crest would be linked to information related to the corresponding club/team. This would enable a strong interaction through social media and other web tools between athletes and/or clubs and fans.

12 Claims, 3 Drawing Sheets

(51) Int. Cl.
*B32B 37/06* (2006.01)
*G06Q 50/18* (2012.01)
*G06F 16/583* (2019.01)
*B41M 3/12* (2006.01)
*B41M 5/025* (2006.01)
*B41M 5/035* (2006.01)
*D06P 5/24* (2006.01)
*B42D 25/305* (2014.01)
*B44C 1/17* (2006.01)

(52) U.S. Cl.
CPC ........... *B41M 5/035* (2013.01); *B42D 25/305* (2014.10); *D06P 5/003* (2013.01); *G06F 16/583* (2019.01); *G06Q 50/184* (2013.01); *B32B 2437/00* (2013.01); *B44C 1/1712* (2013.01)

(58) Field of Classification Search
CPC ............ B32B 37/025; Y10T 428/2813; Y10S 428/914; G03G 7/0093; D06P 5/003; B41M 3/12; B41M 3/14; B41M 3/146; B41M 5/0052; B41M 5/025; B41M 5/0256; B41M 5/035
See application file for complete search history.

(56) References Cited

U.S. PATENT DOCUMENTS

| | | | |
|---|---|---|---|
| 5,979,941 A | 11/1999 | Mosher, Jr. et al. | |
| 6,142,368 A | 11/2000 | Mullins et al. | |
| 6,241,841 B1 | 6/2001 | Mahn et al. | |
| 6,920,709 B2* | 7/2005 | LaMalfa | G09F 1/00 283/75 |
| 7,039,215 B2* | 5/2006 | Suzaki | G06T 1/005 358/3.28 |
| 7,081,324 B1 | 7/2006 | Hare et al. | |
| 7,087,274 B2* | 8/2006 | Xu | B41M 5/502 428/32.12 |
| 7,502,133 B2* | 3/2009 | Fukunaga | G06F 17/30265 358/1.1 |
| 8,320,607 B2* | 11/2012 | Yamaguchi | G06T 1/0028 382/100 |
| 8,830,533 B2* | 9/2014 | Fan | G06K 19/06103 345/589 |
| 8,893,418 B1* | 11/2014 | Yochum | A41D 27/08 2/244 |
| 9,842,518 B2* | 12/2017 | Dinescu | D06Q 1/12 |
| 2003/0213842 A1 | 11/2003 | Jackson | |
| 2004/0000787 A1* | 1/2004 | Vig | B41M 3/14 283/113 |
| 2004/0197536 A1* | 10/2004 | Stahl | B41M 3/12 428/195.1 |
| 2005/0188447 A1* | 9/2005 | Gray | A41D 27/08 2/115 |
| 2006/0064309 A1 | 3/2006 | Leonitta King | |
| 2007/0009732 A1* | 1/2007 | Tsai | B32B 27/00 428/349 |
| 2009/0119818 A1 | 5/2009 | Ngo et al. | |
| 2009/0153301 A1* | 6/2009 | Jetter | G06Q 10/00 340/10.1 |
| 2011/0043858 A1* | 2/2011 | Jetter | G06F 17/30017 358/1.15 |
| 2012/0195499 A1 | 8/2012 | Hosomi | |
| 2012/0320428 A1* | 12/2012 | Jetter | G06Q 50/22 358/3.28 |
| 2014/0108606 A1 | 4/2014 | Beadles | |
| 2014/0109362 A1 | 4/2014 | Bassi | |
| 2014/0360397 A1* | 12/2014 | White | B44C 1/1712 101/488 |

FOREIGN PATENT DOCUMENTS

| | | |
|---|---|---|
| FR | 2678552 | 1/1993 |
| JP | H04-190495 | 7/1992 |
| JP | H11-052863 | 2/1999 |
| JP | H11-227367 | 8/1999 |
| JP | 2001504404 | 4/2001 |
| JP | 2001-138673 | 5/2001 |
| JP | 2003-119661 | 4/2003 |
| JP | 2006-507962 | 3/2006 |
| JP | 2006-164060 | 6/2006 |
| JP | 2006-201997 | 8/2006 |
| JP | 2007-514981 | 6/2007 |
| JP | 2007-276486 | 10/2007 |
| JP | 2008-110508 | 5/2008 |
| JP | 2008-120086 | 5/2008 |
| JP | 2008-207558 | 9/2008 |
| JP | 2010-214636 | 9/2010 |
| JP | 2011-126281 | 6/2011 |
| JP | 2011-256511 | 12/2011 |
| JP | 2013-091203 | 5/2013 |
| JP | 2013-092746 | 5/2013 |
| JP | 3190145 U | 4/2014 |
| WO | 9108117 | 6/1991 |
| WO | 2014/041738 | 3/2014 |

OTHER PUBLICATIONS

International Preliminary Report on Patentability and Written Opinion dated Nov. 22, 2016 for International Application No. PCT/US2014/070353 filed Dec. 15, 2014.

Shoko Goto, Taking picture of poster with cellular phone, and getting information—Trial for commercialization, Japan, ITmedia, Mar. 31, 2004, [Heisei 31 (2019) Jan. 15 search], Internet<URL:http://www.itmedia.co/jp/mobile/articles/0403/31/news033.html.

Hideki Yohida, Digital Watermark Technology that can provide new services, Computer&Network LAN, vol. 22, No. 6, Japan, Ohmsha, Ltd., vol. 22.

\* cited by examiner

COMPOSITE IMAGE HEAT TRANSFER WITH SCANNABLE MARK

CROSS-REFERENCE TO RELATED APPLICATION

The present application claims priority from U.S. Provisional Application No. 62/000,167 filed May 19, 2014 which is incorporated by herein by reference in its entirety.

BACKGROUND

The present invention relates generally to scannable marks or other objects embedded within a heat transfer. The present subject matter is especially suitable for merchandised products associated with sports, but may be used with other applications such as places, famous people, family members, animals and the like. In accordance with embodiments of the present subject matter, scannable marks for clothing are provided. Particular relevance is found in connection with a scannable mark embedded within a heat transfer for providing selected information to a wireless and/or handheld device which captures and/or reads barcodes, QR (quick response) codes, digital water marks, or other like indicia included on heat transfers attached to or otherwise associated with consumer products or other articles. Accordingly, the present specification makes specific reference thereto. However, it is to be appreciated that aspects of the present inventive subject matter are also equally amenable to other like applications.

In a variety of different sports or other marketing or promotional applications, it is well known for the athletes to wear sport jerseys or other apparel that have a unique number and/or a team crest or symbol on it. Further, consumers/fans associate this unique number and/or team crest with a particular athlete and/or team/club. In addition, it is also known that consumers/fans collect stats and other personal information on the athletes and/or sports team/club, and may, on a limited basis, follow their favorite athlete and/or sports team/club via social media. What is needed therefore is a device and/or system which allows a user to access specific stats and other personal information on a specific athlete and/or sports team/club in real time, and which allows users to follow their favorite athlete and/or sports team/club via social media and would promote a strong interaction through social media and other web tools between athletes and/or clubs and fans.

The present invention discloses a composite image heat transfer for use on specific merchandising articles, such as sports jerseys, or other apparel items or accessories. The composite image heat transfer includes a scannable mark embedded within a heat transfer positioned on the front of a sports jersey, such as embedded within a jersey number or a club crest. The scannable mark would be scanned by a user to provide stats, personal information, or other information about the corresponding sports team/club and/or individual athlete. The user can also register the scannable mark and follow the sports team/club and/or athlete on social media, which would enable a strong interaction through social media and other web tools between athletes and/or clubs and fans.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, provides for a composite image heat transfer. The composite image heat transfer comprises a scannable mark embedded in a heat transfer or other object for use on specific merchandising articles, sports jerseys, or other apparel for a specific sport. The scannable mark would be positioned on the heat transfer number or club crest on the front of the jersey, and would be used to provide stats, personal information, or other information about the sports team/club and/or individual athlete. The scannable mark would be scanned by a user, who can then register and follow the sports team/club and/or athlete on social media. Thus, the composite image heat transfer with embedded scannable mark would link each jersey number with information related to the corresponding player/athlete, and each club crest would be linked to information related to the corresponding club/team.

In a preferred embodiment, the scannable mark is applied to the heat transfer jersey number and/or club crest on the front of a sports jersey via any suitable heat transfer means. Additionally, the heat transfer comprises printed material applied to a base material. The base material is typically a non-woven fabric material, but can be any suitable material as is known in the art. The base material would be part of a clothing article, such as a t-shirt, jersey, sweatshirt, or accessory item, hats, belts, shoes, purses, scarves, etc. The printed matter would be visually recognizable information incorporating text, pictures, and/or numbers. The scannable mark would be any suitable scannable mark, such as but not limited to, digital water marks, bar codes and/or QR codes. The scannable marks can be printed with ultraviolet-curable inks, or other suitable inks as is known in the art. A user would scan the scannable mark from the front of the jersey to look up stats, personal information, and other information about the sports team/club and/or individual athlete, and to follow the sports team/club and/or individual athlete on social media. This would enable a strong interaction through social media and other web tools between athletes and/or clubs and fans.

In a further exemplary embodiment method for developing, making, and using the composite image heat transfer on specific merchandising articles, such as sports jerseys, or other apparel for a specific sport is disclosed and includes the steps of initially securing image rights authorization and then positioning a second image and/or scannable mark within the confines of the first image. Next, the desired composite image heat transfer is prepared and then applied to the desired composite image heat transfer to a sports jersey or other similar apparel. The scannable mark is scanned or read to receive stats and personal information on the individual athlete or team associated with the image on the heat transfer which contains the scannable mark.

In a still further embodiment of the presently described invention, a method for using a composite image heat transfer, is disclosed and includes the steps of initially providing an apparel item. A heat transfer is provided with an image disposed thereon. The image can be of any suitable item, including people, teams, places, animals and the like. Next a scannable mark is embedded on the heat transfer. Information relating to the scannable mark is stored in a database with the information being related to the image provided on the heat transfer. The heat transfer is then applied to an apparel item and the scannable mark is read or scanned with a device. Finally, information is obtained from the database on the device.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION

Figure 1:
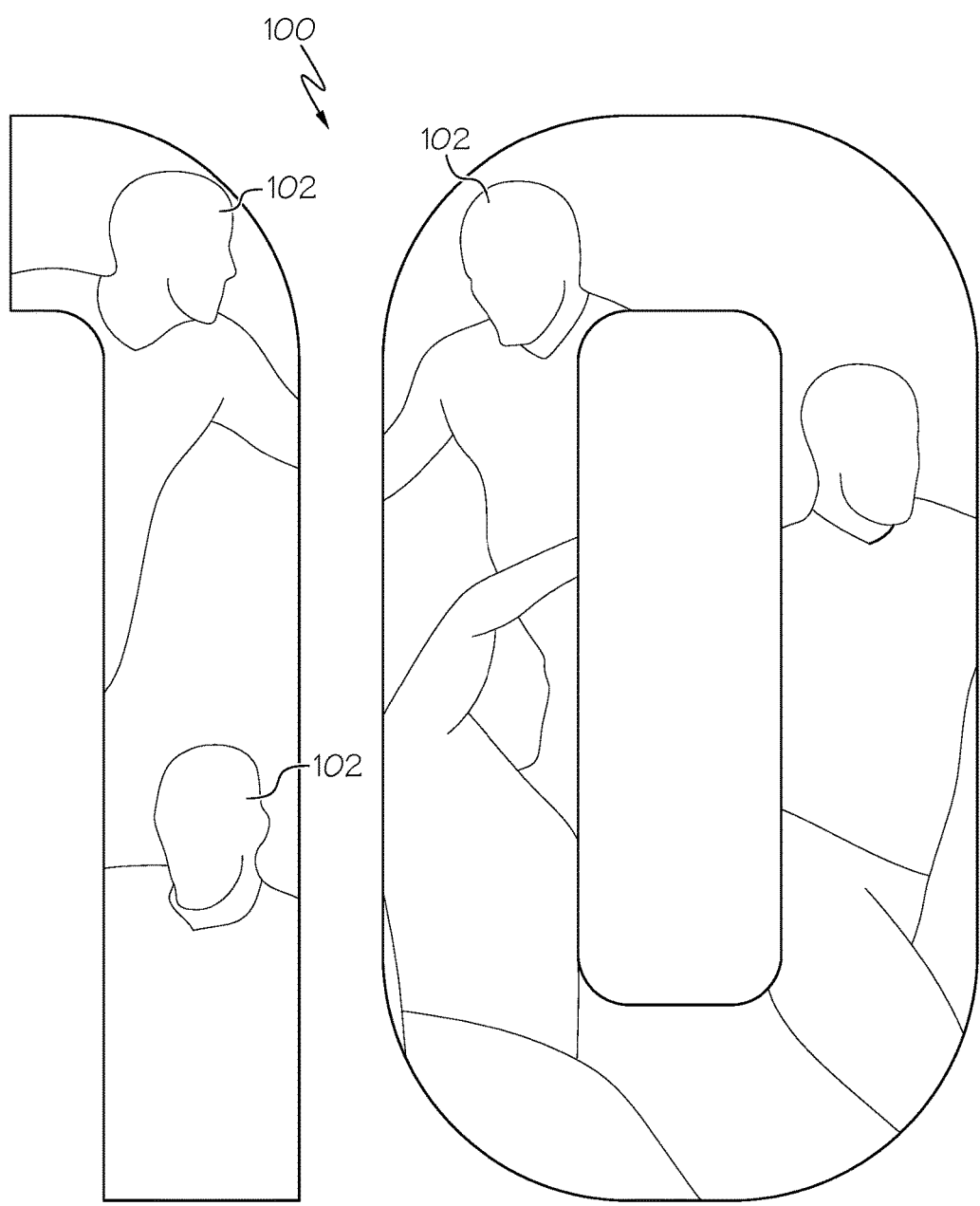
FIG. 1 illustrates a front view of the composite image heat transfer in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a composite image heat transfer for use on specific merchandising or promotional articles, such as sports jerseys, or other apparel items or accessory. The composite image heat transfer includes a scannable mark embedded within a heat transfer positioned on the front of a sports jersey, such as embedded within a jersey number or a club crest. The scannable mark would be scanned by a user to provide stats, personal information, or other information about the corresponding sports team/club and/or individual athlete. The user can also register the scannable mark and follow the sports team/club and/or athlete on social media. Thus, the composite image heat transfer with embedded scannable mark would link each jersey number with information related to the corresponding player/athlete, and each club crest would be linked to information related to the corresponding club/team. This would enable a strong interaction through social media and other web tools between athletes and/or clubs and fans.

Referring initially to the drawings, FIG. 1 illustrates a composite image heat transfer 100 which would be applied to specific sports apparel to increase consumer interaction with an athlete, sports team/club, or the like. The composite image heat transfer 100 may be formed by any suitable method for forming heat transfers as is known in the art.

The composite image heat transfer 100 further comprises scannable mark(s) 102. The scannable marks would be visually recognizable information incorporating text, pictures, and numbers, as well as digital water marks, bar codes and/or QR codes, which are associated with a specific athlete or team/club. Any suitable printed material can be incorporated into the scannable mark 102 of the composite image heat transfer 100, as is known in the art as long as it pertains to the specific athlete or team/club.

For example, an athlete's number can be printed on the jersey. The team or club's crest can also be printed on the jersey. Then, the scannable mark 102, such as a digital water mark, bar code, or QR code, etc., can be embedded within the number or dub crest. For example, in FIG. 1, the digital watermark is embedded within the faces of the athletes (Player 1 on top of the number 1, Player 2 below Player 1 on the number 1 and Player 3 on top of the number 0). The digital watermarks are not visible, but with a mobile device such as a Smartphone or a tablet and an appropriate application, a user could access the right Internet site for each athlete.

The scannable mark 102 would correspond to individual athlete information and/or sports team/club information. The information relates to specific stats and/or personal information about the athlete and/or sports team/club which is stored in a database. The scannable mark 102 can be printed on the composite image heat transfer 100 to specifically identify an athlete and/or team/club and to identify information about that athlete and/or team/club.

Furthermore, the scannable mark 102 would be printed with any suitable ink as is known in the art. For example, the scannable mark 102 can be printed with ultraviolet-curable inks to provide a scannable mark 102 that includes optically readable information, has excellent durability against wind, rain, and light, and can be produced more simply and at low cost. Further, the ultraviolet-curable (UV) inks can be used for anti-counterfeit features, to guarantee that the jerseys are authentic and have been legally acquired by the user. The ultraviolet-curable inks can be any type as long as the ink can be cured by being irradiated with ultraviolet radiation. Other suitable inks can be used for the scannable mark 102 as is known in the art, as long as the inks provide visually recognizable information and durability against adverse conditions.

As stated supra, the composite image heat transfer 100 is applied to a base material. The base material is typically a woven or non-woven fabric material, but can be any suitable material as is known in the art. The base material is typically produced using routine methods known in the art. Further, the base material would typically be part of (incorporated into) a clothing article, such as a t-shirt, jersey, sweatshirt, jersey, apparel accessory, hat, etc., or any other suitable clothing article as is known in the art. The composite image heat transfer 100 is applied to the clothing article via any suitable method as is known in the art for applying heat transfers. The composite image heat transfer 100 would be applied to the front side or the back side of the clothing article, or even on a tag of the clothing article depending on the wants and/or needs of the manufacturer or user.

Figure 2:
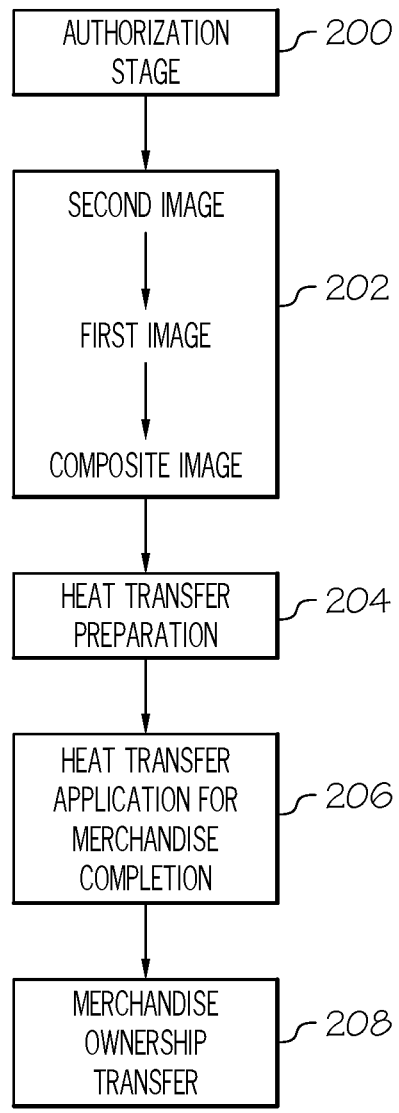
FIG. 2 illustrates a flowchart of developing, making, and using the composite image heat transfer in accordance with the disclosed architecture.

As illustrated in FIG. 2, a method of developing, making, and using the composite image heat transfer is shown. It is anticipated that one of the images of the composite image heat transfer could be a number or crest for a sports team/club, etc. requiring permission and/or licensing fees for reproduction of the desired image or images. Securing image rights authorization in this regard occurs at 200. Images can be photographic or artistic works otherwise developed manually or electronically such as by an artist or graphic artist. It should be understood that the image may also relate to famous people, places, events, animals or any other subject that may be of interest. One may also provide images of family members or friends as part of a social gathering such as a family reunion or the like.

A graphic designer or other artist prepares a keyboard symbol component, as shown in FIG. 1 for example, the numeral "10" having a robust width and generally predefined dimensions in which to position the scannable mark, such as graphic design lettering or balloon-style symbols. However, a large image is not necessary, and a small detail, such as a club crest with a digital watermark would enable the technology to work as well. This procedure further includes at 202, positioning a second image and/or a scannable mark within the confines of the number or sports crest. For example, the number or sports crest can be embedded with just a scannable mark, or as shown in FIG. 1, the number or sports crest can comprise a second image within the number or sports crest. Then, the scannable mark would be embedded within this second image, such as embedded within the faces of the athletes (as shown in FIG. 1).

At 204, the composite image heat transfer is prepared. A suitable heat transfer can be obtained from Avery Dennison Retail Information Services, LLC of Westborough, Mass. and is marketed under the AGILITY® brand. In doing so, the composite image can be transferred onto a substrate that has otherwise complete heat transfer characteristics, in which event placement of the composite images thereon completes preparation of the heat transfer. Alternatively, the composite image can be placed on a sheet that will be subsequently completed by the addition of further sheets, materials or conditions in order to prepare the full substrate needed for a heat transfer. As a further alternative, the composite image and heat transfer substrate components can be compiled and assembled substantially simultaneously. Whatever sequence of production is followed, the desired composite image heat transfer is prepared upon completion of 204. Transfer sheets and/or paper backing can be included to aid in the movement of the heat transfer from the manufacturing point to the assembly or application area. Typically, the transfer of the composite image is a printing phase, often carried out with digital offset presses, such as Indigo® available from HP® of Palo Alto, Calif. Heat transfers can also be produced using conventional flexographic or gravure printing equipment.

A heat transfer application stage is illustrated at 206. The composite image heat transfer is applied to a sports jersey or other similar apparel item or accessory, such as a hat or shoe. Transfers can be provided in cut singles or roll-to-roll formats. Application equipment at this stage or phase can include heat transfer press machines, for example an Avery Dennison CTB-5 Heat Transfer Bonder, available from Avery Dennison Retail Information Services, LLC of Westborough, Mass. Digital or laser transfer approaches and equipment may be suitable for some products. Composite image heat transfer receiving sheets can be made of a variety of materials, synthetic, natural and blends. These can include polymer or plastic components, cellulosic components, woven fabrics or components, non-woven fabrics or components and fiber components.

Typical sports apparel falls in the category of soft goods such as products made from fabric or other pliable or bendable material. Examples include clothing of any type such as shirts, jerseys, and sweatshirts, as well as other products such as banners, flags, covers, bedding, throws and other soft goods.

It will be appreciated that reproduction of the composite image as a heat transfer can be by printing approaches such as screen printing, lithographic offset printing and digital printing. Various methods of carrying this image to the sports item can be employed during the heat transfer application stage at 206. Some methods will vary depending on the substrate and performance requirements. Examples include screen printing a backing ink or backing inks and adhesive, layers behind the composite image, which can be a photographic image. In some instances, the adhesive may be a powder that is spread onto the back of the heat transfer substrate. Essentially any appropriate heat transfer manufacturing method and component details can be practiced.

The symbol can be numeric or alphabetic or any other symbol such as a club crest. In a specific embodiment, the concept of the present disclosure is the placing of a scannable mark, such as a digital water mark, bar code, and/or QR code, etc. on the number or club crest on the front of a sports jersey. It is recognized that either or both of the first and second images may require licensing and be subject to image use guidelines, and it is contemplated that licensing efforts may be a component of the present disclosure's procedure. At 208, users then scan the scannable mark to receive stats and personal information on the individual athlete and/or team/club. Users can also register the scannable mark and then follow the individual athlete and/or team/club on social media.

Figure 3:
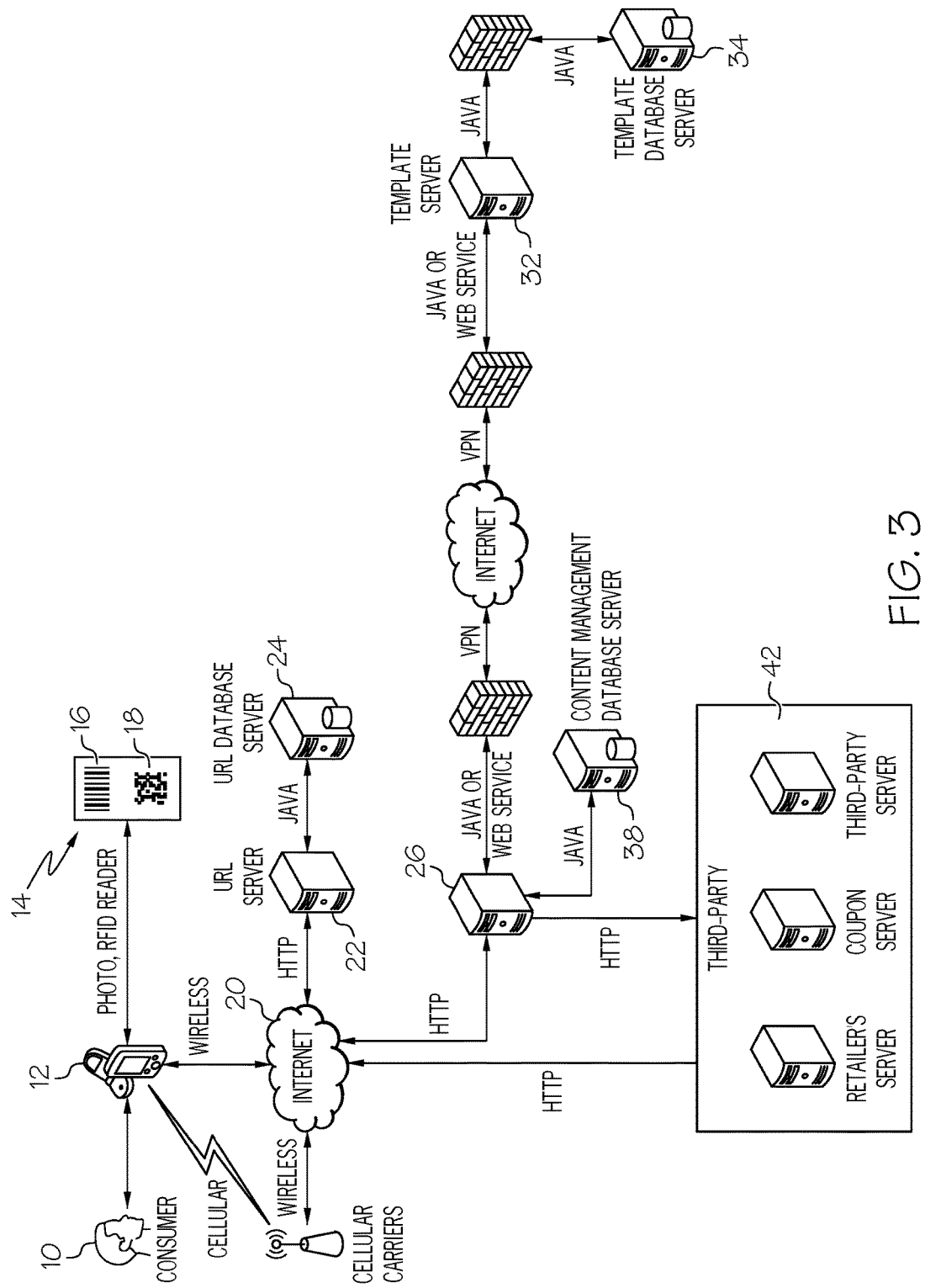
FIG. 3 illustrates an exemplary architecture and/or workflow for obtaining customized information related to a specific sports athlete or team/club of interest to a user in accordance with the disclosed architecture.

With reference now to FIG. 3, there is illustrated an exemplary architecture system and/or workflow in accordance with aspects of the present inventive subject matter. Furthermore, this architecture also includes an embodiment, which uses HF (high frequency) or UHF (ultrahigh frequency) RFID with the scannable mark. Suitably, in a first step, a consumer 10 or other like user launches a suitable application or software (hereinafter nominally referred to as scanning software) supported and/or resident on their portable, handheld and/or mobile device 12, e.g., such as a mobile phone, personal digital assistant (PDA), tablet, handheld or laptop computer or any other similar device. More specifically, the aforementioned application or software, i.e., the scanning software, enables the device 12 to capture and/or read selected indicia and decode or decrypt the same or otherwise extract a code therefrom.

In practice, the consumer 10 uses the scanning software and/or device 12 to selectively scan, read, image and/or photograph a particular marker or indicia assigned to, designated for and/or associated with the sports article or other item of interest to the consumer 10. As shown in the illustrated embodiment, the marker or indicia is printed, encoded or otherwise arranged directly on the front of the sports article or other article of interest to the consumer 10. Suitably, the marker may be for example a retail barcode 16 or a 2D (two-dimensional) barcode 18 (e.g., as shown in the illustrated embodiment), or it may be a QR code, a digital water mark, or any other identifying symbol or indicia assigned to, designated for and/or associated with the sports article or other item of interest. Optionally, the marker may be an electronic marker or signal, e.g., such as the type output from an RFID (Radio Frequency IDentification) tag or the like. The RFID device may be provided as an inlay, which is then inserted onto the apparel. Exemplary RFID devices are available from Avery Dennison RFID Company of Greensboro, N.C.

In an exemplary embodiment, each marker has been printed with or is encoded with or otherwise contains a unique identifier (nominally referred to herein as the marker ID) which is extractable therefrom via the software or application running on the device 12. Alternatively, a label containing the marker can be applied to the sports article after a number of such labels have been printed or otherwise provided with suitable information.

Suitably, the software or application on the device 12 decodes the barcode or symbol and extracts the unique identifier (i.e., the marker ID). For example, the marker ID may be a 13 digit hexadecimal value extracted from a 2D barcode. Of course, optionally, the identifier may not be strictly unique in the sense that it represents a single specific athlete, or other like item or thing. Rather, optionally, a given identifier may represent a particular sports team or club. Accordingly, the same identifier may be encoded or otherwise included in the markers applied to all such sports items for a given team. The identifier could also be used to other famous people such as movie stars, political figures, historical figures, or places, animals, plants or other items which may be suitable for a marketing or promotional campaign or which consumers may wish to have an interaction with.

At the next step, the software or application running on the device 12 makes an http (hypertext transfer protocol) request across the Internet 20, which may be accessed via a cellular or other wireless network or any other similarly available communication method, to a backend URL (Uniform Resource Locator) server 22 and passes thereto (e.g., in the header of the http request) the decoded or otherwise extracted marker ID. In response to receipt of the http request, the URL server 22 and/or appropriate software running thereon makes a standard Java call or the like to a corresponding URL database server 24 to find a URL or other like address associated with the marker ID obtained from the marker. Suitably, the URL database server 24 includes and/or otherwise has access to a database (DB) 26, e.g., such as a DB2 type database produced by International Business Machines Corporation (IBM) or another SQL (Structured Query Language) type database. In general, the DB 26 associates a plurality of different marker IDs with corresponding URLs or other like addresses. Suitably, a single URL or other like address corresponding to a content management server 30 is associated in the DB 26 with a plurality of different marker IDs.

Assuming the URL database server 24 recognizes the obtained marker ID as a number or value associated in the DB 26 with the URL or address of the content management server 30, the URL database server 24 accordingly returns that URL or address (i.e., the target URL or address) to the URL server 22. In turn, the URL server 22 and/or the software running thereon makes an http response back to the portable or mobile device 12 and passes thereto the target URL or other address provided by the URL database server 24.

In response to receiving the target URL or other like address, the device 12 or the software running thereon (e.g., the scanning software) then opens a default or other web browser on the portable/mobile device 12 and makes an http post to the target URL. Accordingly, the http post directs the user 10 (i.e., the web browser running on the device 12) to the content management server 30 and the following information is passed in the http header: Marker ID that was obtained from the scanned or otherwise read marker; an identifier specifying the type of barcode or marker used; a numerical or alphanumerical or other suitable user ID (e.g., which may be contained in the device 12 or the scanning software) that identifies the customer 10; a version number of the scanning software used to scan or read the barcode or other marker; and optionally other information that may be available, e.g., such as a date and/or time of the scan, the GPS (Global Positioning System) coordinates of where the scan was performed or the current location of the device 12, the type (i.e., make and/or model) of the device 12 being used to scan the marker, etc.

In turn, the content management server 30 receives the http post and identifies the portable/mobile device 12 being used. The content management server 30 then holds the http session open and makes a separate Java or web service or other like call across a secure VPN (Virtual Private Network) or other similar network connection to a template server 32 and sends to the template server 32 the information received in the http post from the portable/mobile device 12. Suitably, the template server 32 receives the call from the content management server 30 and in response thereto uses a Java or similar call to contact a template database server 34, which includes or otherwise has access to a DB 36, e.g., such as a DB2 or other SQL type database. In an exemplary embodiment, the DB 36 associates particular marker IDs obtained from scanned markers with corresponding SKU (Stock Keeping Unit) numbers or the like. For example, the DB 36 associates the obtained marker ID with the SKU number or the like assigned to the retail item or other article that is tagged or labeled with or otherwise identified by the marker. In this way then, it is known exactly what sports article or other article is of interest to the consumer 10, i.e., insomuch as its corresponding marker has been scanned, imaged or otherwise read by the consumer's portable/mobile device 12 and/or the scanning software running thereon and ultimately the associated SKU number or the like for that retail item or article has been looked-up in and/or otherwise obtained from the DB 36.

According to one optional embodiment, in addition to the SKU or other like data, each marker ID in the DB 36 is also associated with a template web page ID, and in response to the received Java or other similar call from the template server 32, the template database server 34 returns the corresponding template web page ID to the template server 32, which then returns the received template web page ID (e.g., in a Java or web service or other like response) back to the content management server 30.

In response to the template web page ID received from the template server 32, the content management server 30 makes a Java call or the like to a content management database server 38 that includes or has access to a DB 40 that relates template web page IDs to corresponding web page templates. Accordingly, using the template web page ID received from the content management server 30, the content management database server 38 selects the corresponding web page template from the DB 40 and returns the same to the content management server 30.

In turn, the content management server 30 renders the web page template so that it is optimized for the specific portable/mobile device (as identified previously), and creates an appropriate web page for that device in a suitable and/or otherwise supported format, e.g., such as WML (Wireless Mark-up Language), xHTML (Extensible Hypertext Markup Language), cHTML (Compact HTML), XML (Extensible Mark-up Language), JSP (JavaServer Pages), etc. The content manager server 30 then returns to the browser on the portable/mobile device 12, e.g., via an http response, the rendered web page optimized for that specific device. The web browser on the portable/mobile device 12 accordingly displays the optimized web page to the consumer 10.

Notably, in one suitable embodiment, the web page template that is selected is specific to the item scanned (i.e., the retail or other item of interest that is associated with the tag 14 or the like bearing the scanned marker) so that the user 10 sees on their device 12 a web page that is specific for the item they scanned. Suitably, this is not a generic template, but a customized web page (with potentially dynamic content) for the sports article being scanned by the user 10. In other words, the web page template is generally not a generic template but a specific web page for the product scanned.

In one alternate embodiment, the template web page ID stored in the DB 36 may instead be a URL or other like address for a third party server 42, e.g., such as a coupon server or retail server or the like. Accordingly, in response to the Java or other like call received from the template server 32, the template database server 34 obtains from the DB 36 the URL or other like address of the third party server 42, and in turn returns the same to the template server 32 which then sends it back to the content management server 30. In this case, along with the URL or other like address of the third party server 42, the corresponding SKU number or other like product identifying data from the DB 36 is also included in the data ultimately returned to the content management server 30.

Upon receipt of the URL or other like address of the third party server 42, the content management server 30 executes an http redirect to the third party server 42 and provides, e.g., in the http header, the associated SKU number or other pertinent information that may be used by the third-party server 42 to generate a customized web page for the specific product being scanned by the consumer 10. Suitably, the third party server 42 uses the SKU or other data provided to identify the sports article and returns the appropriate web page to the browser on the portable/mobile device 12, e.g., via a standard http return call.

As can be appreciated from the present specification, the information or content delivered to the device 12 can be customized based on the specific athlete and/or sports team/club of interest to the consumer 10 insomuch as the SKU or other like product identifying information is known. For example, such customized information may include stats on the specific athlete identified or on the specific sports team/club identified, as well as personal information about the athlete and/or team/club, etc. For example, assume a consumer scans a digital watermark on a jersey number on the front of an athlete's jersey or on consumer merchandise, the returned information may include the athlete's stats, personal information about the athlete, such as his likes or dislikes, and stats about the sports team/club in general, as well as other team/club information.

Additionally, it may be desirable to incorporate into the composite image heat-transfer labels of the type described above security features (e.g., anti-theft, anti-counterfeit, anti-parallel imports, etc.). In accordance with the teachings of the present invention, one approach to accomplishing this objective is to incorporate an RFID (radio frequency identification) device into the heat-transfer label. The RFID device may contain information for security purposes and/or a wide variety of other types of information.

For example, the composite image heat transfer can include an RFID integrated circuit having a built-in antenna. Preferably, the RFID integrated circuit is very thin to reduce the bulk of the composite image heat transfer. An example of an RFID integrated circuit with a built-in antenna suitable for use as the RFID integrated circuit is commercially available from Hitachi, Ltd. as the "mu-chip" RFID IC. The "mu-chip" RFID IC has a size of 0.4 mm.times.0.4 mm, operates at a radio frequency 2.45 Ghz and has a 128-bit ROM. The mounting of the RFID integrated circuit between a primer layer and an adhesive layer may be accomplished by depositing the RFID integrated circuit onto the primer layer (before primer layer has dried) and then printing the adhesive layer over the RFID integrated circuit and primer layer. Further, instead of an RFID IC, an RFID strap can be inserted between the adhesive layer and the primer layer. An "RFID strap" comprises the combination of an RFID chip and conductive leads. Examples of RFID straps are disclosed in the following patents and patent applications, all of which are incorporated herein by reference: U.S. Patent Application Publication No. 2003/0136503 entitled RFID LABEL TECHNIQUE, inventors Green et al., published Jul. 24, 2003; U.S. patent application Ser. No. 10/214,066 entitled RADIO FREQUENCY IDENTIFICATION DEVICE AND METHOD, inventor Liu et al., filed Aug. 7, 2002; U.S. patent application Ser. No. 10/406,702 entitled RFID DEVICE DETECTION SYSTEM AND METHOD, inventor Forster, filed Apr. 3, 2003; U.S. Patent Application Ser. No. 60/485,313 entitled RFID DEVICE WITH CHANGEABLE CHARACTERISTICS, inventors Forster et al., filed Jul. 7, 2003; and U.S. Patent Application Ser. No. 60/517,155 entitled RFID TAG WITH ENHANCED READABILITY, inventor Forster, filed Nov. 4, 2003. In addition, an RFID strap is commercially available from Philips Electronics (Netherlands) as the "I-connect" RFID strap. It should be noted that the read distance of wireless RFIDs and of RFID straps is quite small, i.e., about an inch. Accordingly, the RFID information in the RFID straps can only be read when a reader is positioned very close thereto. To enable reading at longer distances, the RFID device preferably includes an antenna.

Another way in which the various composite image heat transfers described above may be endowed with a security feature (anti-theft, anti-counterfeiting, anti-parallel imports) is to incorporate one or more security materials (such as inks and additives) into the label. Security materials may comprise, or be added to, a single layer of the label (such as an ink layer or adhesive layer), or may comprise multiple layers of the label which interact to provide a security indication. Readily apparent (or "overt") security indicators are generally preferred to covert security. Security inks include, but are not limited to, IR-activatable inks, UV-activatable inks, visible light-activatable inks, heat-activatable inks, electrically-activatable inks, magnetically-activatable inks, chemically-activatable inks, humidity-activatable inks, pressure-activatable inks, dichroic inks, time-controlled inks. Security additives include, for example, microscopic tracer particles (or "taggants") that may be incorporated into, e.g., the adhesive layer of the heat-transfer label. Certain molecules can be coded by their physical material composition, color, alpha-numeric characters and other methods. An electronic reader would be used to verify the molecular composition in the heat-transfer label.

Accordingly, the disclosed composite image heat transfer can be used on specific merchandising articles, sports jerseys, or other apparel for a specific sport and can be authenticated by a user. Once legally acquired by a user, the scannable mark would be scanned by a user to provide stats, personal information, or other information about the corresponding sports team/club and/or individual athlete. The user can also register the scannable mark and follow the sports team/club and/or athlete on social media. Thus, the composite image heat transfer with embedded scannable mark would link each jersey number with information related to the corresponding player/athlete, and each club crest would be linked to information related to the corresponding club/team. This would enable a strong interaction through social media and other web tools between athletes and/or clubs and fans.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A composite image heat transfer, comprising
    a sheet where the composite image is placed and is subsequently completed by addition of at least one of sheets, materials or conditions;
    a heat transfer having a scannable mark embedded in the heat transfer and the heat transfer is a number, crest or emblem relating to an athlete or sports team;
    the scannable mark containing a unique identifier positioned on the heat transfer in an area of an image such that the scannable mark is not visible to a user;
    an apparel item suitable for receiving the heat transfer, the scannable mark containing information relating to the image and the scannable mark is linked to a database having information relating to a subject and the database associates a plurality of different unique identifiers with corresponding addresses.

2. The composite heat transfer as recited in claim 1, wherein the scannable mark includes information on the athlete or sports team.

3. The composite heat transfer of claim 1, wherein the scannable mark provides information including stats, personal information, or other information relating to the image.

4. The composite heat transfer of claim 1, wherein the heat transfer includes a RFID device.

5. A composite image heat transfer for use on specific merchandising articles, sports jerseys, or other apparel for a specific sport, comprising:
    a sheet where the composite image is placed;
    a heat transfer; and
    a scannable mark
    within a second image that is within a first image that is printed with UV ink;
    wherein the heat transfer is applied to a clothing article; and
    wherein the scannable mark is a digital water mark, bar code, or QR code that links ouch the composite image to a corresponding image and the second image is an athlete.

6. The composite heat transfer as recited in claim 5, wherein the heat transfer is a number, crest or emblem relating to an athlete or sports team.

7. The composite heat transfer as recited in claim 5, wherein the image is selected from a group including people, groups, animals, places and athletes.

8. The composite heat transfer of claim 7, where in the scannable mark includes information relating to at least one of the group.

9. A method for using a composite image heat transfer, comprising the steps of:
    providing an apparel item;
    providing a sheet where the composite image is placed and the image is selected from a group including people, groups, animals, places and athletes;
    providing a heat transfer, the heat transfer having a first image;
    completing the composite image by addition of at least one of sheets, materials or conditions;
    embedding a scannable mark with a marker ID on the heat transfer for the first image;
    affixing the heat transfer to the apparel item;
    storing information relating to the scannable mark in a database, the information is related to the image provided on the heat transfer;
    applying the heat transfer to the apparel item;
    reading the scannable mark with a device such that the devices makes an http request across the Internet to a URL server and extracts the marker ID to find a URL address associated with the marker ID;
    returning the URL address;
    responding back to the device;
    and obtaining information from the database on the device such that the information is customized based on a specific interest of a consumer.

10. The method of claim 9, including a further step of linking the heat transfer with scannable mark to a database having information relating to a subject prior to the step of embedding.

11. The method of claim 9, including a further step of including a RFID device with the heat transfer after the step of providing an apparel item.

12. A method for developing, making, and using a composite image heat transfer on specific merchandising articles, sports jerseys, or other apparel for a specific sport, comprising the steps of:
    providing a heat transfer substrate;
    securing image rights authorization;
    positioning a second image and/or scannable mark within the confines of a first image;
    preparing the desired composite image heat transfer, the heat transfer including a RFID integrated circuit having a built in antenna and the RFID circuit;
    compiling and assembling the composite image and heat transfer substrate;
    applying the desired composite image heat transfer to a sports jersey or other similar apparel; and
    scanning the scannable mark to receive stats and personal information associated with the scannable mark on the composite image heat transfer such that the first and second image and the heat transfer substrate are compiled and assembled substantially simultaneously.

* * * * *